US012358400B2

(12) United States Patent
Zhao et al.

(10) Patent No.: US 12,358,400 B2
(45) Date of Patent: Jul. 15, 2025

(54) TRANSMISSION SYSTEM FOR POWER LONG RAIL ASSEMBLY (71) Applicant: MAGNA SEATING INC., Aurora (CA)

(72) Inventors: Kai Zhao, Novi, MI (US); Detjon Marini, White Lake, MI (US); Avery Folk, Ontario (CA); Kristof M Kurzeja, Ontario (CA)

(73) Assignee: Magna Seating Inc., Aurora (CA)

( * ) Notice: Subject to any disclaimer, the term of this patent is extended or adjusted under 35 U.S.C. 154(b) by 356 days.

(21) Appl. No.: 17/797,766

(22) PCT Filed: Feb. 8, 2021

(86) PCT No.: PCT/US2021/017004
§ 371 (c)(1),
(2) Date: Aug. 5, 2022

(87) PCT Pub. No.: WO2021/159049
PCT Pub. Date: Aug. 12, 2021

(65) Prior Publication Data
US 2023/0062149 A1 Mar. 2, 2023

Related U.S. Application Data (60) Provisional application No. 62/971,309, filed on Feb. 7, 2020.

(51) Int. Cl.
*B60N 2/02* (2006.01)
*B60N 2/015* (2006.01)
*B60N 2/90* (2018.01)

(52) U.S. Cl.
CPC ..... *B60N 2/02253* (2023.08); *B60N 2/01508* (2013.01); *B60N 2/02246* (2023.08); *B60N 2002/924* (2018.02)

(58) Field of Classification Search
CPC ............ B60N 2/02253; B60N 2/01508; B60N 2/02246; B60N 2002/924; B60N 2/06; B60N 2/067
See application file for complete search history.

(56) References Cited

U.S. PATENT DOCUMENTS 3,123,333 A * 3/1964 Rose .................. B60N 2/02246
248/394
4,852,934 A * 8/1989 Yasuda .............. B60N 2/02246
296/64

(Continued)

FOREIGN PATENT DOCUMENTS

CN 108045275 5/2018
CN 208306408 U * 1/2019 ........... B60N 2/0232

(Continued)

*Primary Examiner* — Kimberly T Wood
(74) *Attorney, Agent, or Firm* — Miller Canfield (57) ABSTRACT

A transmission system for providing sliding movement of a vehicle seat within a vehicle includes a dual output motor having a left-hand and right-hand motor output shafts, a left-hand bevel gearbox and a right-hand bevel gearbox operatively coupled to a respective one of the left-hand and right-hand output motor shafts, a left-hand long rail assembly comprising a left-hand power rail drive assembly slidably coupled to a left-hand fixed long rail and operatively coupled to the left-hand bevel gearbox and a right-hand long rail assembly comprising a right-hand power rail drive assembly slidably coupled to a right-hand fixed long rail and operatively coupled to the right-hand bevel gearbox. The dual output motor rotates the left-hand and right-hand motor output shafts resulting in each of the left-hand and right-hand power rail drive assemblies being transposed along the respective left-hand and right-hand fixed long rails.

13 Claims, 8 Drawing Sheets

(56) References Cited

U.S. PATENT DOCUMENTS

| | | | |
|---|---|---|---|
| 5,762,309 A * | 6/1998 | Zhou | B60N 2/02246 297/344.11 |
| 6,691,971 B2 | 2/2004 | Yamada et al. | |
| 8,844,891 B2 | 9/2014 | Yamada et al. | |
| 10,011,195 B2 | 7/2018 | Kume et al. | |
| 10,894,488 B2 * | 1/2021 | Maloney | B60N 2/01 |
| 11,760,233 B2 * | 9/2023 | Napau | B60N 2/0825 296/65.15 |
| 12,071,044 B2 * | 8/2024 | Zhao | B60N 2/07 |
| 12,151,596 B2 * | 11/2024 | Zhao | B60N 2/0732 |
| 2010/0320352 A1 * | 12/2010 | Weber | F16H 25/20 74/89.23 |
| 2018/0334054 A1 * | 11/2018 | Higuchi | B60N 2/02246 |
| 2020/0369178 A1 * | 11/2020 | Maloney | B60N 2/01 |
| 2021/0370804 A1 * | 12/2021 | Zhao | B60N 2/067 |
| 2022/0048411 A1 * | 2/2022 | Zhao | B60N 2/02253 |
| 2022/0161691 A1 * | 5/2022 | Zhao | B60N 2/06 |
| 2022/0219569 A1 * | 7/2022 | Zhao | B60N 2/06 |
| 2022/0396179 A1 * | 12/2022 | Zhao | B60N 2/005 |
| 2023/0294564 A1 * | 9/2023 | Zhao | B60N 2/0224 248/429 |

FOREIGN PATENT DOCUMENTS

| | | | |
|---|---|---|---|
| CN | 109878384 A * | 6/2019 | B60N 2/0232 |
| CN | 106991932 B * | 12/2019 | G09F 13/00 |
| DE | 102012111477 A1 * | 5/2014 | B60N 2/067 |
| EP | 0359008 | 3/1990 | |
| EP | 0979750 A3 * | 4/2001 | |
| GB | 2245333 | 1/1992 | |
| JP | H0628350 Y2 * | 8/1994 | |
| JP | 2019098916 A * | 6/2019 | B60N 2/0232 |
| KR | 10-0803305 | 2/2008 | |
| KR | 20100033583 | 3/2010 | |
| WO | 2020/082094 | 4/2020 | |
| WO | 2020/186259 | 9/2020 | |

* cited by examiner

TRANSMISSION SYSTEM FOR POWER LONG RAIL ASSEMBLY

CROSS-REFERENCE TO RELATED APPLICATIONS

This application claims priority to and all the benefits of U.S. Provisional Application 62/971,309, filed Feb. 7, 2020, and entitled "Transmission System For Power Long Rail Assembly", the disclosure of which is hereby incorporated by reference in its entirety.

BACKGROUND OF THE INVENTION

1. Field of the Invention

The present invention relates to a transmission system for driving a pair of long rail assemblies configured to transpose a vehicle seat along fixed long rails wherein the vehicle seat is removably attached to the long rail assemblies.

2. Description of Related Art

Many vehicles today have systems that give vehicle seats the capability of power adjustment. Certain vehicle systems include one or more fixed long rails attached to a vehicle floor and a power rail drive assembly configured to transpose a vehicle seat along the fixed long rail. Often, the vehicle seat is configured to be decoupled from the power rail drive assembly such that the vehicle seat can be removed from the vehicle and reattached to the power rail drive assembly as desired. Further, certain vehicle systems include a rack extending along the fixed long rail and a drive wheel attached to the power rail drive assembly and driven by a power source. The vehicle seat is transposed along the fixed long rail by rotation of the drive wheel along the rack in the fixed long rail. The power source is typically a motor located within the power rail drive assembly or within the vehicle seat.

When certain vehicle seats are attached to left-hand and right-hand power rail drive assemblies and a single drive motor is operatively coupled to the left-hand and right-hand power drive assemblies, the single drive motor can be operatively coupled to the power rail drive assemblies through flex cables, such as disclosed in related PCT publication WO/2020/186259 A1.

An alternate known vehicle seat includes a drive motor operatively coupled through drive shafts to left-hand and right-hand gearboxes attached to the vehicle seat, such as disclosed in Korea Patent 10-0803305. Each of the left-hand and right-hand gearboxes have a pinion drive shaft projecting from each of the left-hand and right-hand gearboxes with a pinion fixedly coupled to the pinion drive shaft. Each pinion drive shaft is configured such that the pinion meshingly engages with a gear rack within a respective left-hand or right-hand fixed long rail for transposing the known vehicle seat along the left-hand and right-hand fixed long rails.

However, it is desirable to include a worm gearbox within each of a left-hand and right-hand power rail drive assemblies configured to rotate a drive wheel that is meshingly engaged with a rack within a respective left-hand and right-hand fixed long rail. Further, it is desirable to removably couple each worm gearbox with a respective left-hand and right-hand bevel gearbox attached to the vehicle seat. In addition, it is desirable to simultaneously drive the left-hand and right-hand bevel gearbox input shafts by a single dual output brushless motor. Finally, it is desirable to operatively couple each of the first and second motor output shafts with respective input shafts for the bevel gearboxes.

SUMMARY OF THE INVENTION

The present invention relates to a transmission system for providing sliding movement of a vehicle seat within a vehicle. The transmission system includes a motor having left-hand and right-hand motor output shafts, a left-hand bevel gearbox and a right-hand bevel gearbox operatively coupled to a respective one of the left-hand and right-hand output motor shafts, a left-hand long rail assembly comprising a left-hand power rail drive assembly slidably coupled to a left-hand fixed long rail and operatively coupled to the left-hand bevel gearbox; and a right-hand long rail assembly comprising a right-hand power rail drive assembly slidably coupled to a right-hand fixed long rail and operatively coupled to the right-hand bevel gearbox. The motor rotates the left-hand and right-hand motor output shafts resulting in each of the left-hand and right-hand power rail drive assemblies being transposed along the respective left-hand and right-hand fixed long rails.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

FIGS. 1-8 illustrate a transmission system 5 comprising right-hand and left-hand long rail assemblies 10, 10' having power rail drive assemblies 12, 12A configured to provide sliding adjustment of a vehicle seat 14 in an automotive vehicle according to embodiments described herein. Directional references employed or shown in the description, figures or claims, such as top, bottom, upper, lower, upward, downward, lengthwise, widthwise, left, right, and the like, are relative terms employed for ease of description and are not intended to limit the scope of the invention in any respect. Referring to the Figures, like numerals indicate like or corresponding parts throughout the several views. While certain components disclosed herein are described as "left-hand" and "right-hand", it is understood that these descriptions are reversible depending on a perspective view of the components. Further, the phrases "left-hand" and "right-hand" are understood to be equivalent to "first" and "second" or similar phrases when describing a plurality of similar components within the transmission system 5 and/or with an automotive vehicle.

Figure 1:
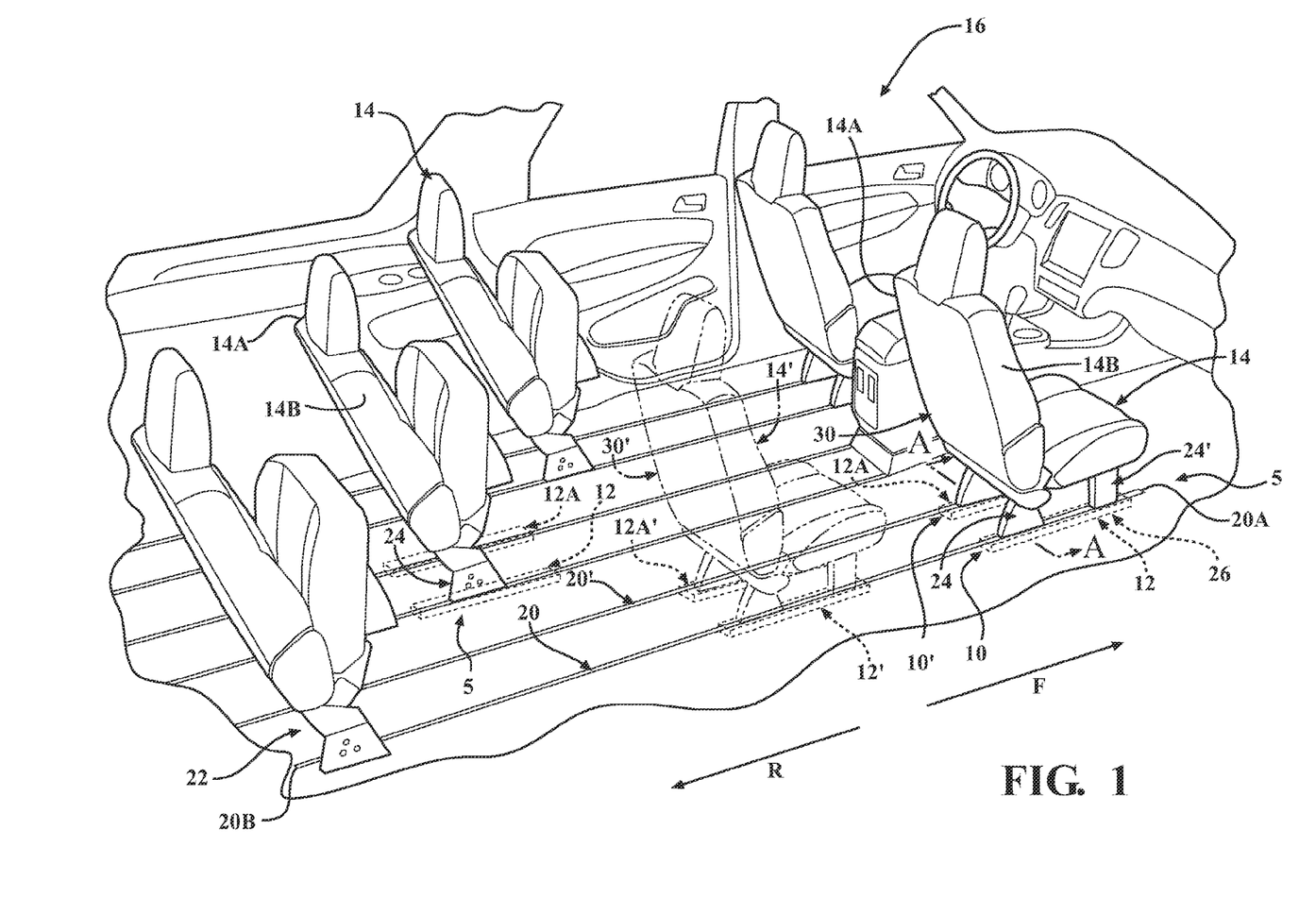
FIG. 1 is a fragmentary perspective view of a vehicle interior having a vehicle seat coupled to left-hand and right-hand long rail assemblies, according to one embodiment of the present invention.
Figure 2:
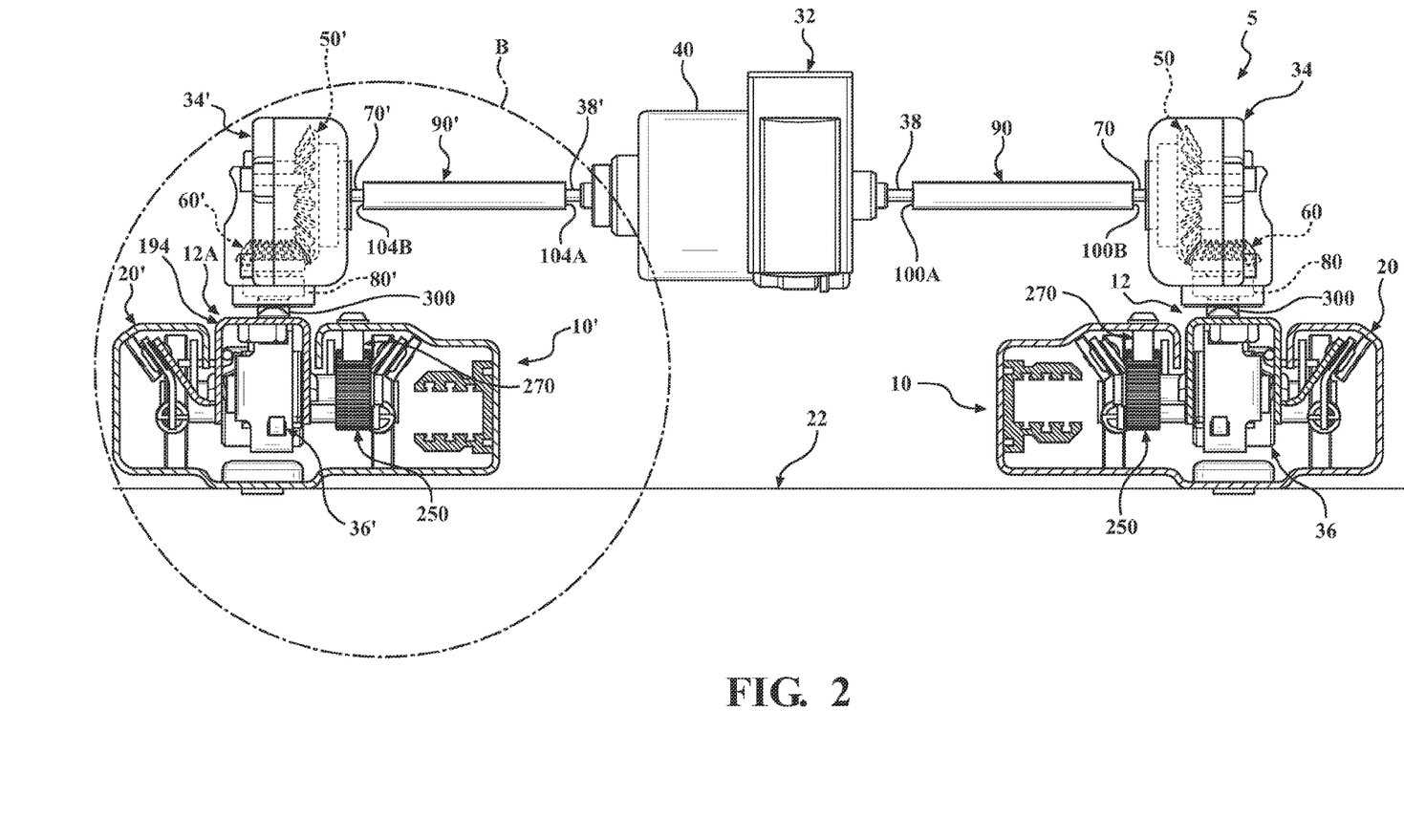
FIG. 2 is a partially transparent cross-sectional end view of the transmission system of FIG. 1 taken along cross-section line A-A in FIG. 1, illustrating the transmission system having a dual output brushless motor operatively coupled to right-hand and left-hand bevel gearboxes with each of the right-hand and left-hand bevel gearboxes operatively coupled to a respective one of right-hand and left-hand power rail drive assemblies for transposing the vehicle seat along associated right-hand and left-hand fixed long rails.

FIG. 1 shows an interior 16 of a vehicle having a plurality of vehicle seats 14 with each vehicle seat 14 connected to a transmission system 5 configured to transpose the vehicle seat 14 in a forward direction F and a rearward direction R within the vehicle. Referring to FIGS. 1 and 2, the right-hand long rail assembly 10 comprises a right-hand fixed long rail 20 attached to a vehicle floor 22 and a right-hand power rail drive assembly 12 configured to travel along the right-hand fixed long rail 20. The left-hand long rail assembly 10' comprises a left-hand fixed long rail 20' attached to the vehicle floor 22 and a left-hand power rail drive assembly 12A configured to travel along the left-hand fixed long rail 20'.

Also shown in FIG. 1, each vehicle seat 14 is supported by at least one leg 24, or optionally rear and front legs 24, 24', on opposing sides 14A, 14B of the vehicle seat 14. The vehicle seat 14 has at least one leg 24, 24' on opposing sides 14A, 14B of the vehicle seat 14 attached to a latch assembly 26 for removably coupling the vehicle seat 14 to the respective right-hand and left-hand power rail drive assembly 12, 12A. Each of the right-hand and left-hand power rail drive assemblies 12, 12A travel along a respective right-hand or left-hand fixed long rail 20, 20' attached to the vehicle floor 22. Each of the right-hand and left-hand fixed long rails 20, 20' extend longitudinally between opposing first and second fixed long rail ends 20A, 20B defining an interior cavity 28 (shown in FIG. 3) therebetween.

In the embodiment shown in FIG. 1, each vehicle seat 14 travels along a pair of fixed long rails 20, 20' when the vehicle seat 14 is repositioned between a first seat location 30 and a second seat location 30', shown as the repositioned vehicle seat 14' removably coupled to the repositioned power rail drive assemblies 12', 12A'. The right-hand and left-hand long rail assemblies 10, 10' allow for improved vehicle seat 14 position adjustment since the vehicle seat 14 coupled to the right-hand and left-hand power rail drive assemblies 12, 12A is repositionable to any seat location 30, 30' along the respective right-hand and left-hand fixed long rails 20, 20'. Furthermore, each vehicle seat 14 can be decoupled from the right-hand and left-hand power rail drive assemblies 12, 12A allowing the number of vehicle seats 14 within the vehicle interior 16 to be adjusted or varied as desired.

A cross-sectional view of the transmission system 5 taken along section line A-A of FIG. 1 is shown in FIG. 2. Referring to FIG. 2, the transmission system 5 includes a dual output brushless motor 32 operatively coupled to right-hand and left-hand bevel gearboxes 34, 34'. Each of the right-hand and left-hand bevel gearboxes 34, 34' is releasably coupled to a respective right-hand and left-hand worm gearbox 36, 36' within a respective one of the right-hand and left-hand power rail drive assemblies 12, 12A. Each of the right-hand and left-hand power rail drive assemblies 12, 12A is configured to travel along a respective one of the right-hand and left-hand fixed long rails 20, 20'.

Figure 8:
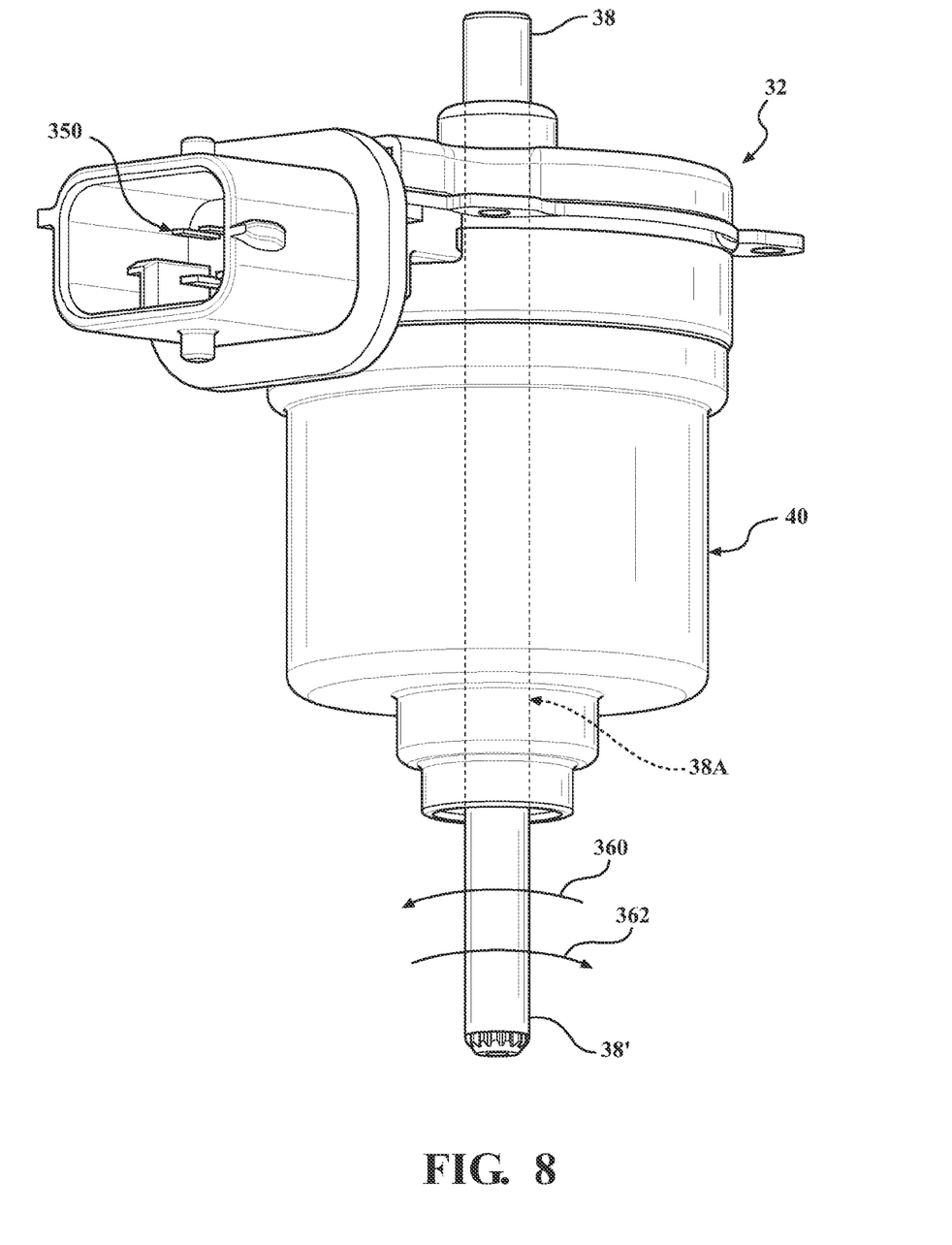
FIG. 8 is a perspective view of the dual output brushless motor of the transmission system of FIG. 2.

As shown in FIG. 2, the dual output brushless motor 32 has a first motor output shaft 38 and a second motor output shaft 38' extending from a motor housing 40. The dual output brushless motor 32 is configured to simultaneously drive both the first and second motor output shafts 38, 38'. Alternatively, in certain embodiments, the first motor output shaft 38 and the second motor output shaft 38' define opposing ends of a single output shaft 38A passing through the motor housing 40, as illustrated in FIG. 8.

Also shown in FIG. 2, each of the right-hand and left-hand bevel gearboxes 34, 34' includes a respective right-hand and left-hand driving bevel gear 50, 50' meshingly engaged with a respective right-hand and left-hand driven bevel gear 60, 60'. Each driving bevel gear 50, 50' is fixedly coupled to a respective right-hand and left-hand input shaft 70, 70'. Likewise, each driven bevel gear 60, 60' is fixedly coupled to a respective right-hand and left-hand output shaft 80, 80'. A right-hand intermediary shaft 90 has a first shaft end 100A fixedly coupled to the first motor output shaft 38 and an opposing second shaft end 100B fixedly coupled to the right-hand input shaft 70 of the right-hand driving bevel gear 50. In addition, a left-hand intermediary shaft 90' has a first shaft end 104A fixedly coupled to the second motor output shaft 38' and an opposing second shaft end 104B fixedly coupled to the left-hand input shaft 70' of the left-hand driving bevel gear 50'. When the dual output brushless motor 32 rotates the first and second motor output shafts 38, 38', the intermediary shafts 90, 90' cause the respective attached driving bevel gears 50, 50' to rotate, which in turn cause the respective driven bevel gears 60, 60' to rotate. Each of the right-hand and left-hand bevel gearboxes 34, 34' is configured to change the direction of the power transmission by 90 degrees. Further, the bevel gearboxes 34, 34' serve as speed amplifiers by introducing a 2:1 gear ratio. It is understood that alternate embodiments of the bevel gearboxes 34, 34' may include different gear ratios as selected for specific applications.

The transmission system 5 shown in FIG. 2 includes the right-hand long rail assembly 10 and the left-hand long rail assembly 10' with each long rail assembly 10, 10' having a respective power rail drive assembly 12, 12A configured to travel along associated right-hand and left-hand fixed long rails 20, 20'. Further, the transmission system 5 includes the dual output brushless motor 32 operatively coupled to right-hand and left-hand bevel gearboxes 34, 34' for a 90-degree redirection of the torque provided by the dual output brushless motor 32. The dual output brushless motor 32 is configured to drive both the right-hand and left-hand power rail drive assemblies 12, 12A simultaneously to avoid synchronization issues. In addition, each of the right-hand and left-hand bevel gearboxes 34, 34' is releasably coupled to a respective worm gearbox 36, 36' within one of the right-hand and left-hand power rail drive assemblies 12, 12A. The power transmission system 5 is designed to simultaneously actuate the right-hand and left-hand power rail drive assemblies 12, 12A, causing the right-hand and left-hand power rail drive assemblies 12, 12A to move forward F or rearward R along the respective right-hand and left-hand fixed long rails 20, 20. In addition, the right-hand and left-hand bevel gearboxes 34, 34' redirect the torque from the dual output brushless motor 32 to the worm gearboxes 36, 36' in each of the right-hand and left-hand power rail drive assemblies 12, 12A. Each worm gearbox 36, 36' drives a drive wheel 250 that is meshingly engaged with a rack 270 extending along each of the right-hand and left-hand fixed long rails 20, 20'.

Figure 3:
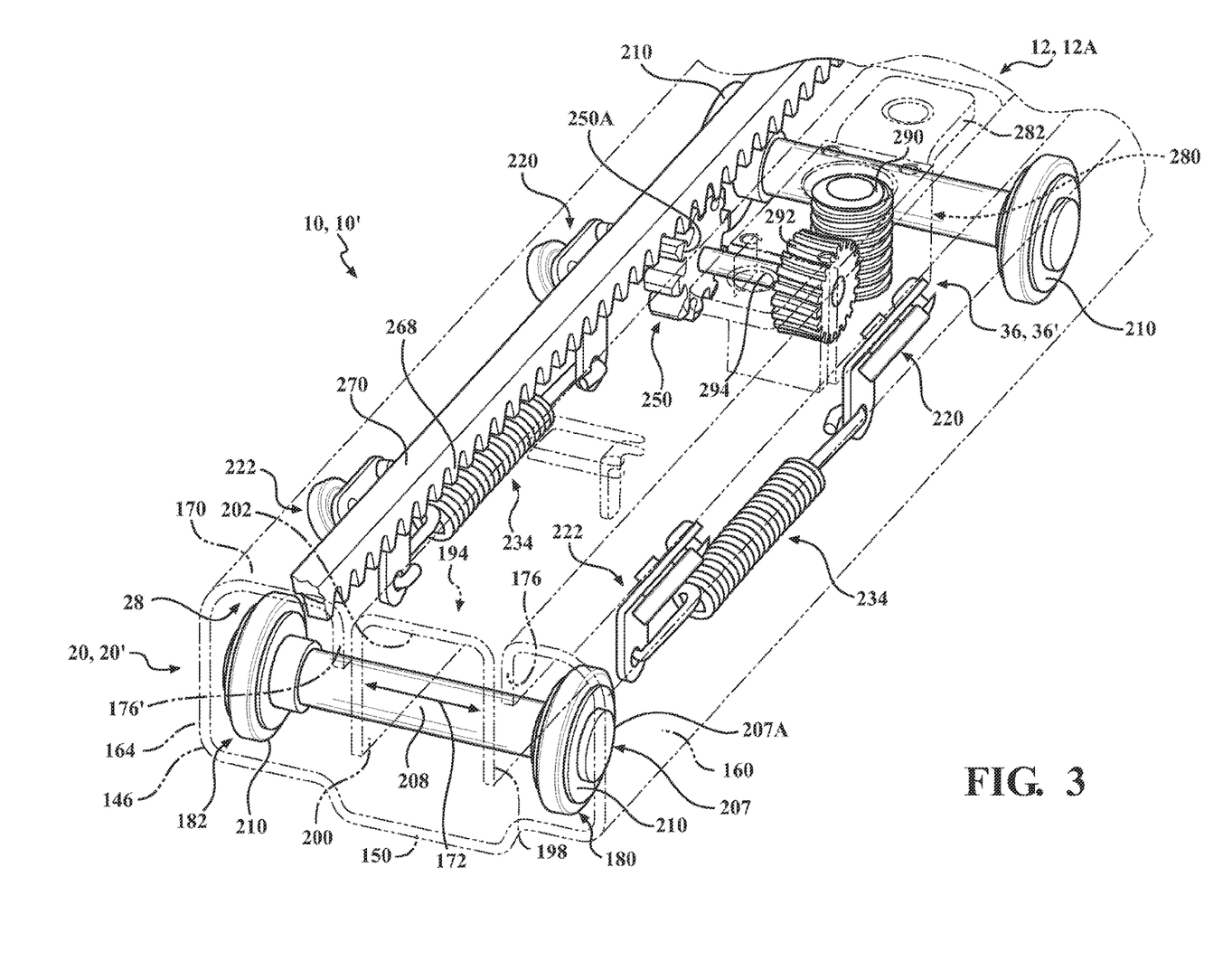
FIG. 3 is a partially transparent perspective view of the one of the long rail assemblies of FIG. 1, illustrating a power rail drive assembly configured to travel along a fixed long rail, according to one embodiment of the present invention.

FIG. 3 is a partially transparent perspective view of a portion of one of the right-hand and left-hand long rail assemblies 10, 10', illustrating additional details of the right-hand and left-hand power rail drive assemblies 12, 12A and the right-hand and left-hand fixed long rails 20, 20'. Referring to FIG. 3, one embodiment of the fixed long rails 20, 20' comprises a lower channel having a generally U-shaped cross-sectional profile 146 extending in a longitudinal direction, a bottom wall 150, opposing side walls 160, 164, and a top wall 170 having an elongated opening 172 extending in a longitudinal direction. A retaining lip 176, 176' extends downward from the top wall 170 adjacent the elongated opening 172. Each side wall 160, 164 of the right-hand and left-hand fixed long rails 20, 20' includes a respective track 180, 182 having a generally C-shaped cross-sectional profile. The fixed long rails 20, 20' are a stamped, formed, molded, and/or rolled section of a metal or plastic material having a length selected based on a specific application. It should be appreciated that the size and shape of the fixed long rails 20, 20' may vary without altering the scope of the invention.

Also shown in FIG. 3, each of the right-hand and left-hand power rail drive assemblies 12, 12A include an upper channel 194 having a generally inverted U-shaped cross-sectional profile comprising opposing first and second side walls 198, 200, and a top wall 202 extending between the opposing first and second side walls 198, 200. It should be appreciated that the size and shape of the upper channel 194 can vary without altering the scope of the invention.

In order to allow for smooth movement of the vehicle seat 14, an axle 207 extends laterally through a hollow tube 208 extending between the opposing first and second side walls 198, 200 of the upper channel 194, as illustrated in FIG. 3. A wheel 210 is fixedly coupled to each end 207A of the axle 207. While not shown, the wheels 210 can be replaced by rollers and/or glides coupled to the opposing first and second side walls 198, 200 of the upper channel 194. Any number and/or combination of wheels 210, rollers, and/or glides may be used as suitable for an intended application.

As shown in FIG. 3, each of the right-hand and left-hand power rail drive assemblies 12, 12A optionally have front and rear lateral stability rollers 220, 222 rotationally coupled to each of the opposing first and second side walls 198, 200 of the upper channel 194. In the embodiment shown in FIG. 3, the front and rear lateral stability rollers 220, 222 attached to each of the opposing first and second side walls 198, 200 of the power rail drive assemblies 12, 12A are coupled together through a tension spring 234. The tension spring 234 biases the lateral stability rollers 220, 222 towards engagement with the associated right-hand or left-hand fixed long rail 20, 20'. It should be appreciated that the lateral stability rollers 220, 222 can vary in size, shape, and number, and further can be omitted without altering the scope of the invention. The lateral stability rollers 220, 222 absorb fixed long rail 20, 20' variations in one or both of lateral and vertical directions based in part on a selected configuration of the lateral stability rollers 220, 222.

Further description of the sliding movement between each of the right-hand and left-hand power drive rail assemblies 12, 12A and the respective right-hand and left-hand fixed long rails 20, 20' is fully set forth in Applicant's co-pending application PCT/US2020/022908, entitled Long Rail Assembly With Internal Power Driving System, filed Mar. 16, 2020, the disclosure of which is hereby incorporated by reference in its entirety.

Referring to FIG. 3, the worm gearboxes 36, 36' are located within the respective right-hand and left-hand power rail drive assembly 12, 12A and are operatively coupled to a drive wheel 250 located within the respective right-hand and left-hand fixed long rails 20, 20'. The drive wheel 250 has gear teeth 250A configured to meshingly engage with gear teeth 268 on the rack 270 fixedly coupled to the associated fixed long rail 20, 20'. The worm gearboxes 36, 36' having a drive wheel 250 paired with the rack 270 are part of the transmission system 5 for the fore-aft (forward F/rearward R) motion of the power vehicle seat 14. Preferably, the drive wheel 250 may be a plastic gear since the drive wheel 250 is not a load-carrying component. While the drive wheel 250 can comprise other materials as desired for an intended application, the plastic drive wheel 250 provides a quiet driving method as each power rail drive assembly 12, 12A travels along the associated fixed long rail 20, 20'. Further, the gear teeth 268 on the rack 270 prevent driving slip when the gear teeth 268 meshingly engage with the gear teeth 250A on the drive wheel 250.

The driving system of each of the right-hand and left-hand long rail assemblies 10, 10' includes the respective worm gearbox 36, 36', the rack 270, and the drive wheel 250 that are packaged within the respective right-hand and left-hand fixed long rails 20, 20' and the respective upper channel 194, as shown in FIG. 3. Containing the respective worm gearbox 36, 36', the rack 270, and the drive wheel 250 within the associated fixed long rail 20, 20' and within the upper channel 194 reduces the amount of contamination that can affect the operation of the right-hand and left-hand long rail assemblies 10, 10'.

Figure 4:
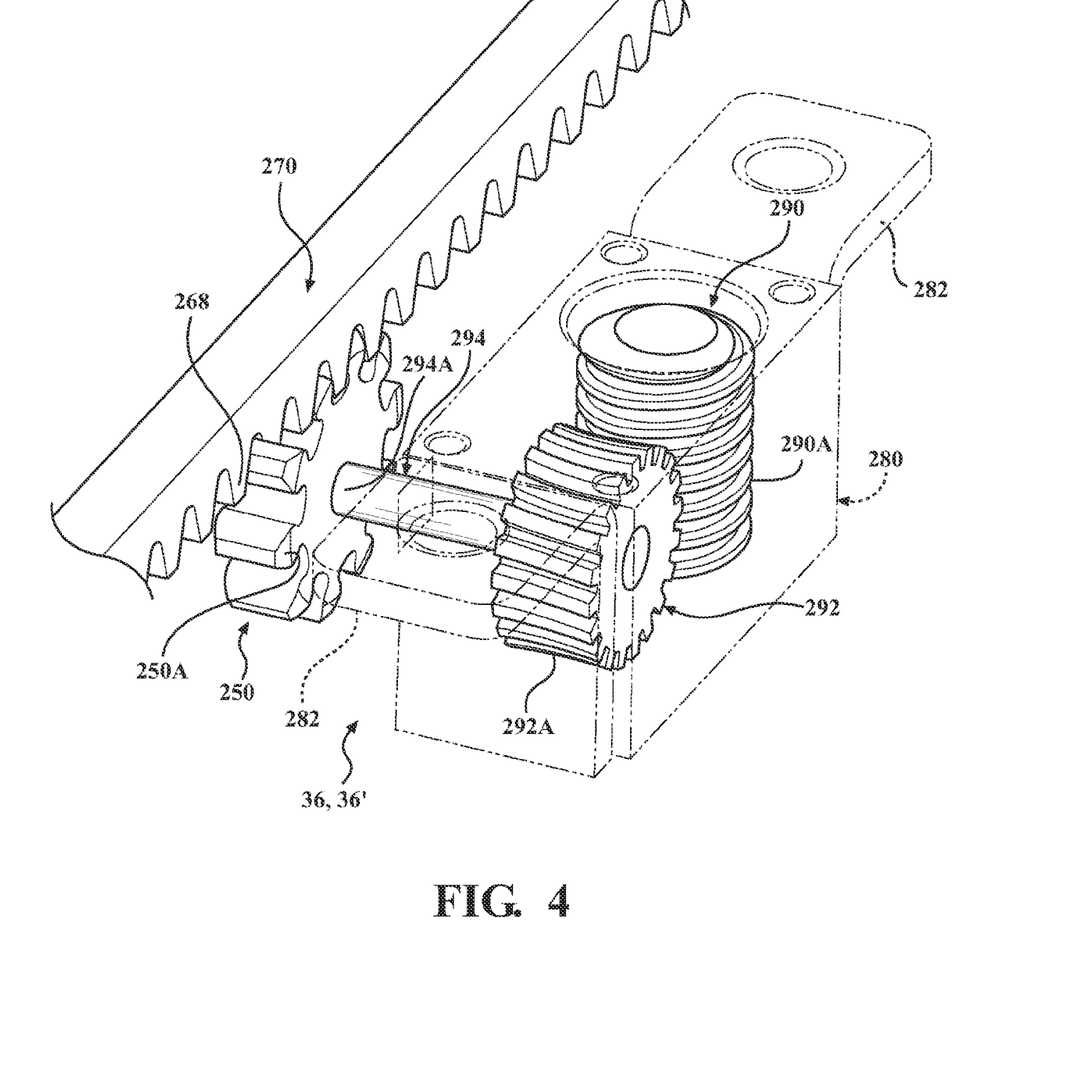
FIG. 4 is partially transparent perspective view of a worm gearbox and a rack of FIG. 3 removed from the long rail assembly.

A partially transparent view of the worm gearbox 36, 36' and the rack 270 removed from the long rail assembly 10, 10' of FIG. 3 is shown in FIG. 4, illustrating internal components of the worm gearbox 36, 36'. The worm gearbox 36, 36' provides the torque needed for rotation of the drive wheel 250. The worm gearbox 36, 36' includes a worm gearbox housing 280 supported by a mounting bracket 282 that is fixedly coupled to the upper channel 194 of the power rail drive assembly 12, 12A (shown in FIG. 3). Referring to FIG. 4, the worm gearbox housing 280 supports and contains a worm gear 290 meshingly engaged with a worm wheel 292. In the embodiment shown in FIG. 4, the worm gear 290 is configured to be driven by the bevel gearbox 34, 34'. Further, the worm wheel 292 has gear teeth 292A configured to meshingly engage with a curved or involute tooth 290A on the worm gear 290. In addition, a drive shaft 294 projects axially from the worm wheel 292 with a distal end 294A of the drive shaft 294 fixedly coupled to the drive wheel 250. Thus, the drive wheel 250 is operatively coupled to the worm gear 290 within the worm gearbox 36, 36' via the worm wheel 292. While the drive wheel 250 is shown as a spur gear in FIG. 4, other embodiments of the worm gearbox 36, 36' can include other types of gears including lateral drive wheels, spiral gears, herringbone gears, flexible shafts, worm gears, and the like, without altering the scope of the invention.

Figure 5:
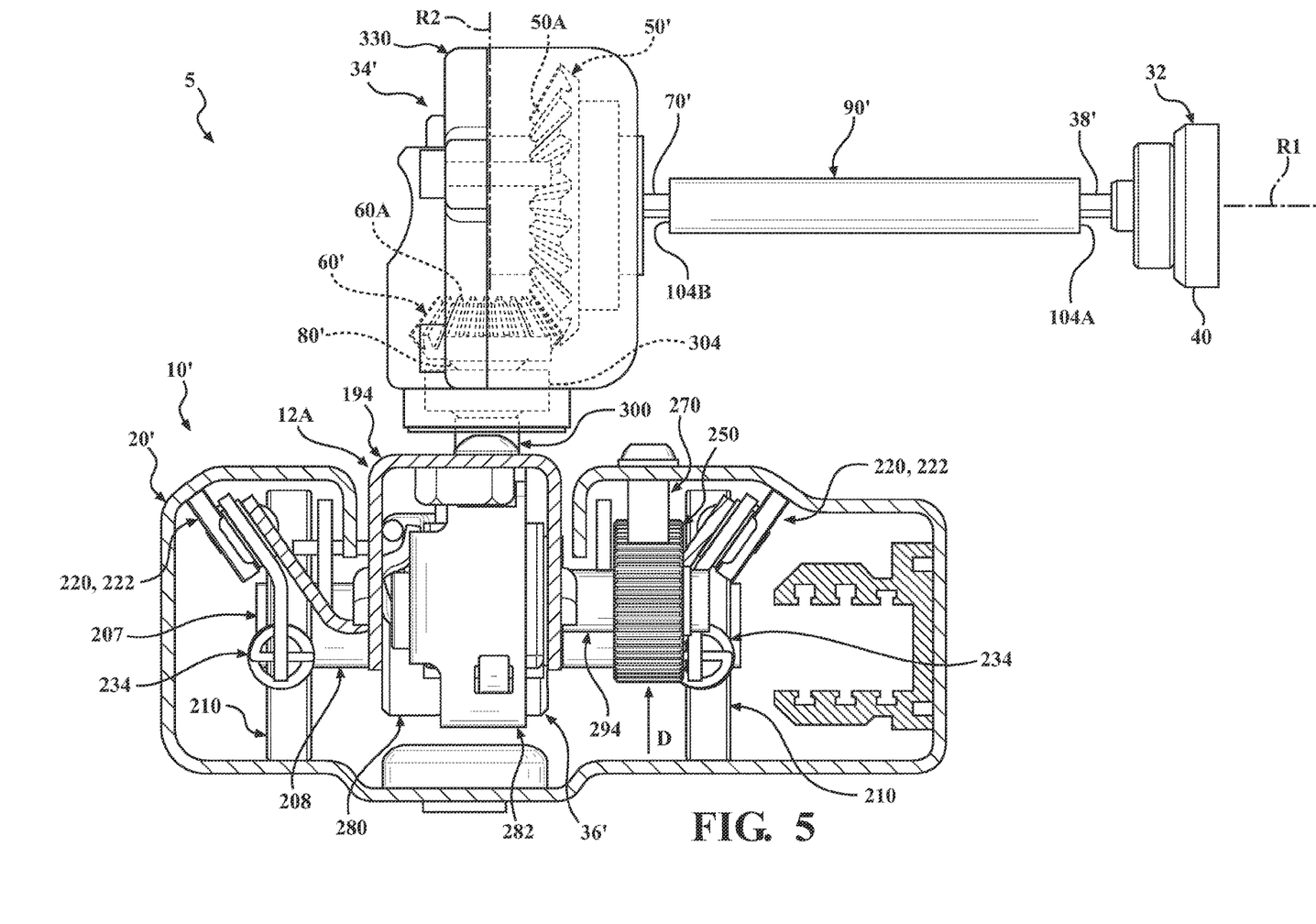
FIG. 5 is an enlarged partially transparent cross-sectional view of portion B of the transmission system of FIG. 2, illustrating a left-hand bevel gearbox releasably coupled to a worm gearbox within a left-hand power rail drive assembly configured to travel along a left-hand fixed lower rail.

An enlarged view of portion B of the transmission system 5 shown in FIG. 2 is illustrated in FIG. 5. While FIG. 5 shows the left-hand bevel gearbox 34' and the left-hand long rail assembly 10', it is understood that the right-hand bevel gearbox 34 and the right-hand long rail assembly 10 are similarly constructed. It is also understood that certain embodiments of the transmission system 5 can include dissimilar components, including more or less components, in the right-hand and left-hand long rail assemblies 10, 10' and in the right-hand and left-hand bevel gearboxes 34, 34'. In some embodiments, the right-hand long rail assembly 10 and the right-hand bevel gearbox 34 are generally described as mirror images of the left-hand long rail assembly 10' and left-hand bevel gearbox 34', respectively.

Referring to FIG. 5, the second motor output shaft 38' of the dual output brushless motor 32 is fixedly coupled to the first shaft end 104A of the left-hand intermediary shaft 90'. The second shaft end 104B of the left-hand intermediary shaft 90' is fixedly coupled to the left-hand input shaft 70' projecting from the left-hand driving bevel gear 50'. The left-hand input shaft 70' of the left-hand driving bevel gear 50' extends along a rotational axis R1 of the left-hand driving bevel gear 50'. The left-hand driving bevel gear 50' includes a plurality of gear teeth 50A that are meshingly engaged with gear teeth 60A of the left-hand driven bevel gear 60'. The left-hand driven bevel gear 60' has a left-hand output shaft 80' projecting from the left-hand driven bevel gear 60' along a rotational axis R2 of the left-hand driven bevel gear 60'.

Figure 6:
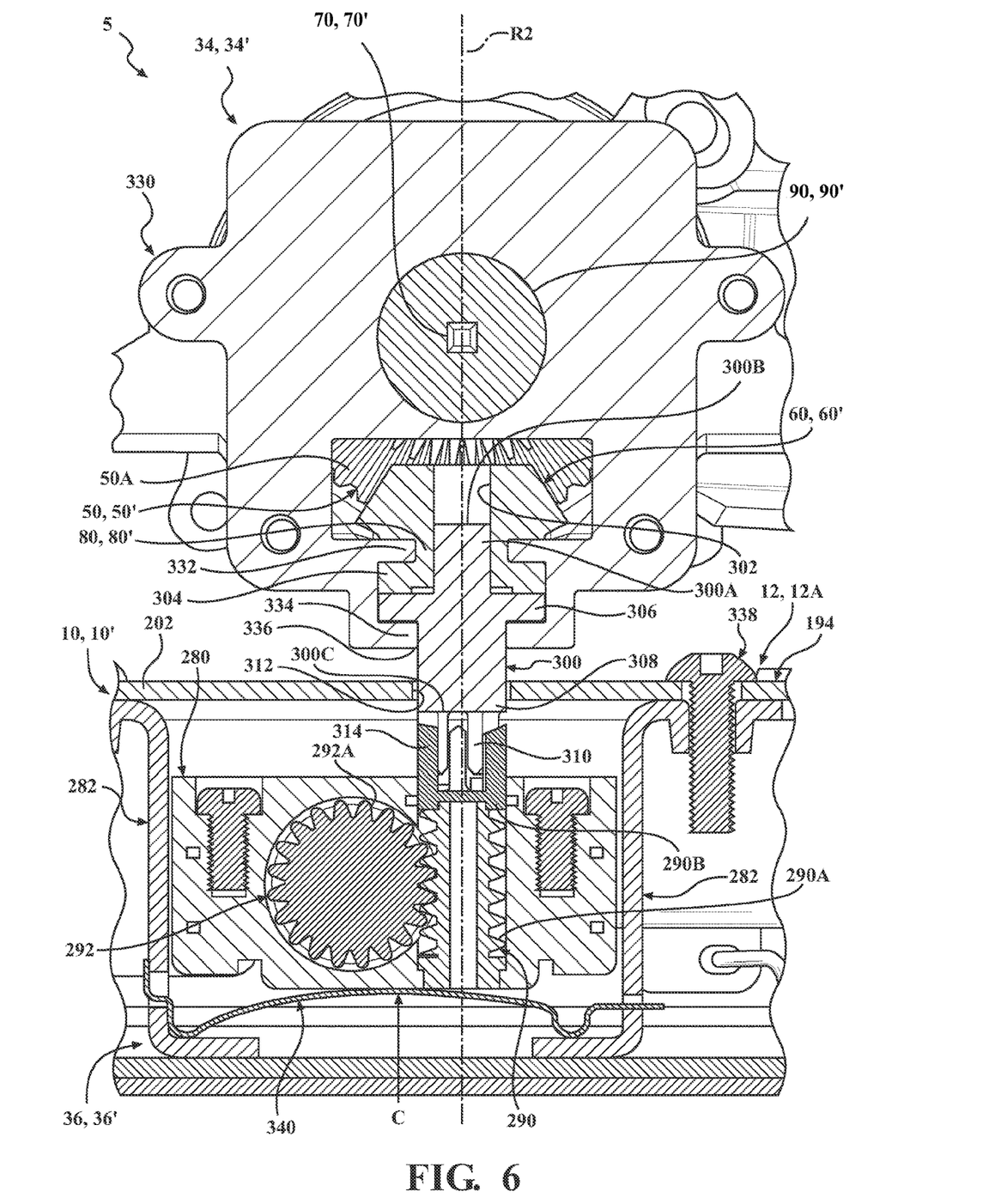
FIG. 6 is cutaway side view of a portion of the transmission system shown FIG. 5, illustrating the worm gearbox within the power rail drive assembly, the bevel gearbox, and a quick connection interface releasably coupling the bevel gearbox to the worm gearbox.

FIG. 6 shows a cross-sectional view of a portion of the left-hand long rail assembly 10' of FIG. 5 illustrating additional details of a quick connection interface 300 releasably coupling the left-hand output shaft 80' of the left-hand driven bevel gear 60' of the left-hand bevel gearbox 34' to the worm gear 290 in the left-hand worm gearbox 36'. The right-hand bevel gearbox 34 and the right-hand long rail assembly 10 are constructed with similar components as shown in FIG. 6. The quick connection interface 300 helps center each of the bevel gearboxes 34, 34' with the worm gears 290 when the vehicle seat 14 is being coupled and latched to each of the right-hand and left-hand power rail drive assemblies 12, 12A.

Referring to FIG. 6, the output shafts 80, 80' of the driven bevel gears 60, 60' have a central bore 302 extending longitudinally through the driven bevel gears 60, 60' aligned to the axis of rotation R2 of the driven bevel gears 60, 60'. A collar 304 extends circumferentially around the central bore 302 in the driven bevel gears 60, 60'. Preferably, the collar 304 is integrally formed with the driven bevel gears 60, 60'. Alternatively, in some embodiments the collar 304 can be formed as a separate piece and assembled with the driven bevel gears 60, 60'.

As shown in FIG. 6, the quick connection interface 300 has a generally elongated cylindrical shape extending in a longitudinal direction, a cylindrical boss 300A extending towards an upper end 300B of the quick connection interface 300, an interface collar 306 extending circumferentially around the cylindrical boss 300A, an engagement shaft 308 extending from the interface collar 306 in longitudinal direction of the quick connection interface 300 and away from the cylindrical boss 300A, and a meshing spline 310 projecting from a lower end 300C of the engagement shaft 308. Preferably, the interface collar 306 is integrally formed with the quick connection interface 300. Alternatively, in some embodiments the interface collar 306 can be formed as a separate piece and assembled with the quick connection interface 300. The cylindrical boss 300A and the interface collar 306 of the quick connection interface 300 are sized and shaped such that the cylindrical boss 300A matingly engages with the central bore 302 of the driven bevel gears 60, 60' when the interface collar 306 frictionally engages with the collar 304 of the driven bevel gears 60, 60'. The engagement shaft 308 is sized and shaped such that the engagement shaft 308 extends through an opening 312 in the upper channel 194 with the meshing spline 310 aligned with a face spline 314 projecting from an upper end 290B of the worm gear 290. It is understood that the structure of the quick connection interface 300 and the worm gearboxes 36, 36' may vary between different embodiments of the transmission system 5 without altering the scope of the invention.

Also shown in FIG. 6, the face spline 314 of the worm gear 290 and the meshing spline 310 of the quick connection interface 300 are sized and shaped such that the face spline 314 and meshing spline 310 will matingly engage and rotation of the quick connection interface 300 results in rotation of the worm gear 290. The face spline 314 of the worm gear 290 is an input drive shaft for the worm gear 290. The face spline 314 and the meshing spline 310 include self-alignment features that ensure full engagement between the quick connection interface 300 extending from the bevel gearboxes 34, 34' and the worm gear 290 in the worm gearboxes 36, 36'. When the face spline 314 and the meshing spline 310 are fully engaged (as shown in FIG. 6), the axis of rotation R2 of the driven bevel gears 60, 60', the quick connection interface 300, and the worm gear 290 are aligned. While FIG. 6 illustrates a quick connection interface 300 operatively coupling each of the bevel gearboxes 34, 34' with the respective worm gearbox 36, 36', in alternate embodiments the bevel gearboxes 34, 34' are operatively coupled to the worm gearboxes 36, 36' using a flex cable.

In the embodiment shown in FIG. 6, torque is transferred from the first and second motor output shafts 38, 38' of the dual output brushless motor 32 via the respective right-hand and left-hand intermediary shafts 90, 90' to the respective input shaft 70, 70' of each of the right-hand and left-hand driving bevel gears 50, 50'. Each driving bevel gear 50, 50' transfers torque to the respective driven bevel gear 60, 60' within each of the right-hand and left-hand bevel gearboxes 34, 34'. Each of the right-hand and left-hand driven bevel gears 60, 60' transfers torque through a quick connection interface 300 to the worm gear 290 within the associated right-hand or left-hand worm gearbox 36, 36'. Each worm gear 290 transfers the received torque to the worm wheel 292 within the respective right-hand or left-hand worm gearbox 36, 36' and to the connected drive wheel 250. Each drive wheel 250 is meshingly engaged with the rack 270 within the associated right-hand or left-hand fixed long rail 20, 20'. Thus, rotation of the drive wheels 250 transpose the right-hand and left-hand power rail drive assemblies 12, 12A along the respective right-hand and left-hand fixed long rails 20, 20'. The vehicle seat 14 is repositioned by movement of the right-hand and left-hand power rail drive assemblies 12, 12A along the respective right-hand and left-hand fixed long rails 20, 20'.

As illustrated in FIG. 6, the bevel gearboxes 34, 34' include a bevel gearbox housing 330 configured to support and contain the driving bevel gears 50, 50', the driven bevel gears 60, 60', and the quick connection interface 300 matingly engaged with the driven bevel gears 60, 60'. The bevel gearbox housing 330 includes a first bearing surface 332 configured to support and retain the output shafts 80, 80' of the driven bevel gears 60, 60' and a second bearing surface 334 configured to support and retain the quick connection interface 300. The first and second bearing surfaces 332, 334 of the bevel gearbox housing 330 maintain engagement between the driven bevel gears 60, 60' and the quick connection interface 300. The lower end 300C of the quick connection interface 300 projects through an aperture 336 in the bevel gearbox housing 330.

In the embodiment of the worm gearboxes 36, 36' shown FIG. 6, the worm gearboxes 36, 36' comprise a worm gearbox housing 280 that contains and supports the worm gear 290 and the worm wheel 292. The worm gearbox housing 280 is supported by a mounting bracket 282 that is fixedly coupled to the upper channel 194 by one or more fasteners 338. The worm gearboxes 36, 36' shown in FIG. 6 have a 20:1 gear ratio to drive the drive wheel 250 along the rack 270. It is understood that alternate embodiments of the worm gearboxes 36, 36' may include different gear ratios without varying the scope of the invention.

As illustrated in FIG. 6, the worm gearbox housing 280 is preferably configured to be repositionable within the mounting bracket 282 in a direction perpendicular to the longitudinal axis of upper channel 194 when the worm gearboxes 36, 36' and the mounting bracket 282 are assembled with the upper channel 194. However, alternate embodiments include a worm gearbox housing 280 that is fixedly coupled directly to the upper channel 194 and/or fixedly coupled to the mounting bracket 282. In the embodiment shown in FIG. 6, a spring 340 is positioned between the mounting bracket 282 and the worm gearbox housing 280 and biases the worm gearbox housing 280 towards the top wall 202 of the upper channel 194, as illustrated by arrow C. When each power rail drive assembly 12, 12A is assembled with the associated fixed long rail 20, 20', the spring 340 biases the drive wheel 250 towards an engaged position with the rack 270, as illustrated by arrow D shown in FIG. 5. While a leaf spring 340 is shown in the Figures, any suitable spring type can be used including compression, extension, spiral, and the like, as non-limiting examples.

Further description of the worm gearboxes 36, 36' and the quick connection interface 300 is fully set forth in Applicant's co-pending applications PCT/US2021/015989, entitled Spring Loaded Gearbox for Power Long Rail Assembly, filed Feb. 1, 2021, and PCT/US2020/059274, entitled Gearbox Quick Connection for Power Long Rail Assembly, filed Nov. 6, 2020, the disclosures of which are both hereby incorporated by reference in their entirety.

Figure 7:
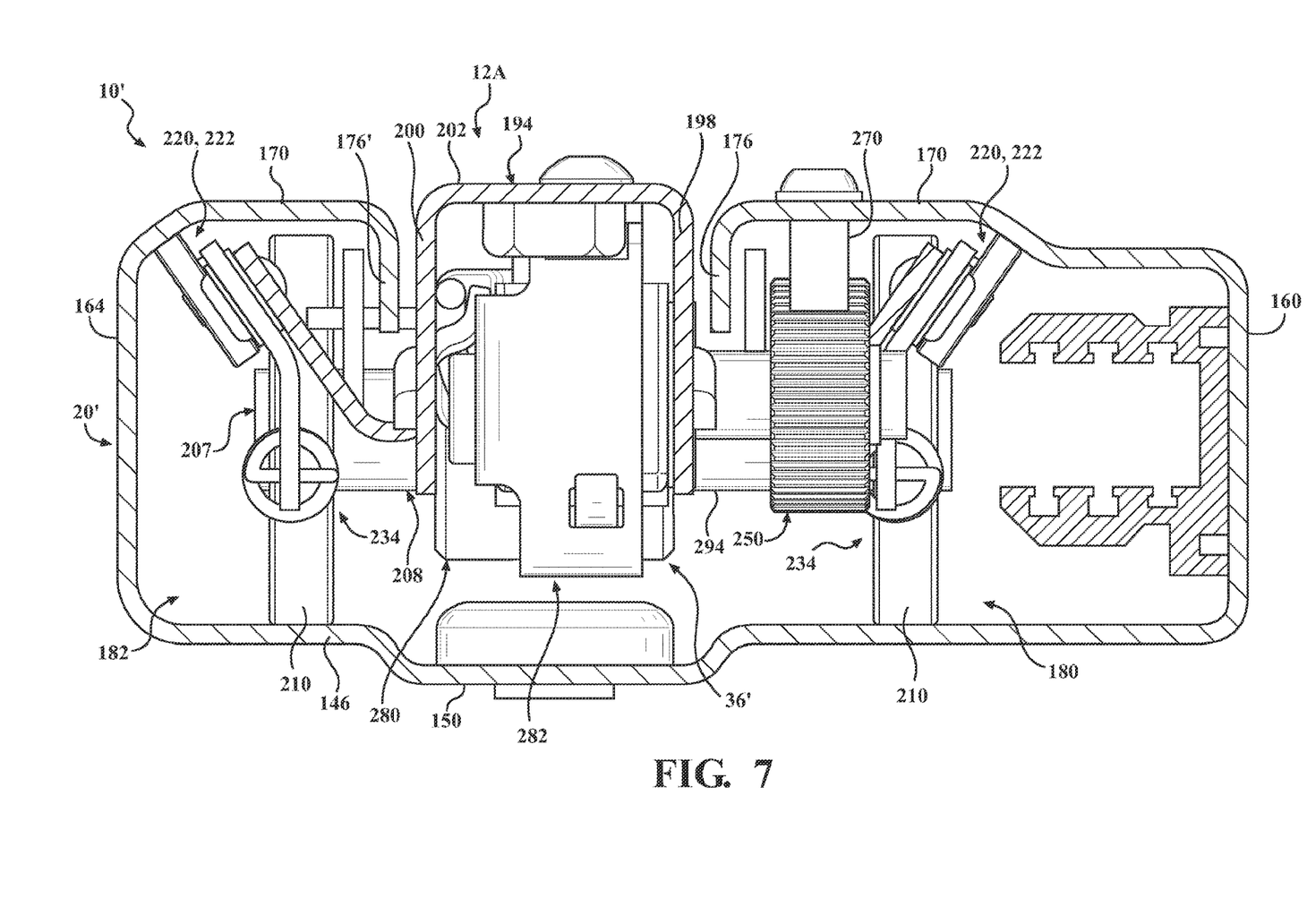
FIG. 7 is a cross-sectional view of the left-hand long rail assembly of FIG. 5 decoupled from the vehicle seat.

FIG. 7 shows the left-hand long rail assembly 10' of FIG. 5 after removal of the vehicle seat 14. The left-hand bevel gearbox 34', the intermediary shaft 90', and the dual output brushless motor 32 are removed with the vehicle seat 14. The right-hand and left-hand bevel gearboxes 34, 34' and the quick connection interfaces 300 can be selectively recoupled to the respective worm gearboxes 36, 36' as desired to recouple the vehicle seat 14 to the respective right-hand and left-hand long rail assemblies 10, 10'.

The dual output brushless motor 32 is shown in FIG. 8 removed from the transmission system 5 of FIG. 2. Referring to FIG. 8, the dual output brushless motor 32 includes a first motor output shaft 38 and a second motor output shaft 38'. In certain embodiments, the first motor output shaft 38 and the second motor output shaft 38' form opposing ends of a single motor output shaft 38A passing through the motor housing 40. In other embodiments the first and second motor output shaft 38, 38' are separate shafts operatively coupled together. Also shown in FIG. 8, a motor power connecter 350 extends from the motor housing 40.

Selectively providing power to the motor power connector 350 results in the dual output brushless motor 32 rotating the first and second motor output shafts 38, 38' in one of a first rotational direction 360 and a second rotational direction 362. The first rotational direction 360 is different and opposite from the second rotational direction 362. The dual output brushless motor 32 rotates the first and second motor output shafts 38, 38' in the first rotational direction 360 when repositioning the vehicle seat 14 in the forward direction F along the fixed long rails 20, 20'. In contrast, the dual output brushless motor 32 rotates the first and second motor output shafts 38, 38' in the opposite second rotational direction 362 when repositioning the vehicle seat 14 in the rearward direction R along the fixed long rails 20, 20'.

The dual output brushless motor 32 of FIG. 8 is configured to provide torque to the transmission system 5 and drives both the right-hand and left-hand power rail drive assemblies 12, 12A to avoid synchronization issues. The dual output brushless motor 32 provides the capability of two separate motor speeds, i.e. a first (fast) speed and a second (slow) speed. More specifically, in the preferred embodiment the dual output brushless motor 32 provides both a fast speed adjustment of about 300 mm/sec and a comfort speed adjustment of about 20 mm/sec of vehicle seat 14 movement through pulse width modulation provided by a control module. In certain embodiments, the pulse width modulation is provided by an external control module to the dual output brushless motor 32. In other embodiments, the control module is integrated within the dual output brushless motor 32.

One benefit of the transmission system 5 for the long rail assemblies 10, 10' is the worm gearboxes 36, 36' are included within each of a right-hand and left-hand power rail drive assemblies 12, 12A that are configured to rotate a drive wheel 250 meshingly engaged with a rack 270 within a respective right-hand and left-hand fixed long rail 20, 20'. A second benefit is the transmission system 5 includes a right-hand and left-hand bevel gearbox 34, 34' attached to the vehicle seat 14 and configured to releasably couple to the respective worm gearbox 36, 36' within the respective right-hand and left-hand power rail drive assemblies 12, 12A. A third benefit is the transmission system 5 includes a dual output brushless motor 32 configured to provide torque to both the right-hand and left-hand bevel gearboxes 34, 34'. A fourth benefit is the transmission system 5 includes right-hand and left-hand intermediary shafts 90, 90' operatively coupling a respective one of first and second motor output shafts 38, 38' to a respective one of right-hand and left-hand input shafts 70, 70' of bevel gearboxes 34, 34'.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A transmission system for providing sliding movement of a vehicle seat within a vehicle, said transmission system comprising:

a motor having a left-hand motor output shaft and a right-hand motor output shaft, said left-hand motor output shaft being operatively coupled to said right-hand motor output shaft such that both left-hand and right-hand motor output shafts simultaneously rotate in a selected one of a first rotational direction and a second rotational direction different from said first rotational direction;

a left-hand bevel gearbox and a right-hand bevel gearbox, each of said left-hand and right-hand bevel gearboxes being operatively coupled to a respective one of said left-hand and right-hand motor output shafts of said motor;

a left-hand long rail assembly comprising a left-hand power rail drive assembly slidably coupled to a left-hand fixed long rail, said left-hand power rail drive assembly being operatively coupled to said left-hand bevel gearbox; and a right-hand long rail assembly comprising a right-hand power rail drive assembly slidably coupled to a right-hand fixed long rail, said right-hand power rail drive assembly being operatively coupled to said right-hand bevel gearbox;

wherein said motor rotating said left-hand and right-hand motor output shafts in said first rotational direction results in said left-hand and right-hand power rail drive assemblies being transposed along said respective left-hand and right-hand fixed long rails in a first direction;

wherein said motor rotating said left-hand and right-hand motor output shafts in said second rotational direction results in said left-hand and right-hand power rail drive assemblies being transposed along said respective left-hand and right-hand fixed long rails in a second direction different from said first direction;

wherein each of said left-hand and right-hand bevel gearboxes includes a driving bevel gear meshingly engaged with a driven bevel gear, said driving bevel gear of said left-hand bevel gearbox includes a left-hand input shaft fixedly coupled to said driving bevel gear, said driving bevel gear of said right-hand bevel gearbox includes a right-hand input shaft fixedly coupled to said driving bevel gear, and said left-hand input shaft being operatively coupled to said left-hand motor output shaft and said right-hand input shaft being operatively coupled to said right-hand motor output shaft;

wherein said left-hand input shaft being fixedly coupled to a first end of a left-hand intermediary shaft with an opposing second end of said left-hand intermediary shaft being fixedly coupled to said left-hand motor output shaft of said motor;

wherein said right-hand input shaft being fixedly coupled to a first end of a right-hand intermediary shaft with an opposing second end of said right-hand intermediary shaft being fixedly coupled to said right-hand motor output shaft of said motor; and wherein each of said left-hand and right-hand power rail drive assemblies includes an upper channel, a plurality of wheels rotatably coupled to said upper channel, and a rail drive gearbox within said upper channel.

2. The transmission system of claim 1, wherein:
each of said left-hand and right-hand fixed long rails includes a rack fixedly coupled to said respective left-hand and right-hand fixed long rail.

3. The transmission system of claim 2, wherein:
each of said left-hand and right-hand power rail drive assemblies includes a drive wheel meshingly engaged with said rack fixedly coupled to a respective one of said left-hand and right-hand fixed long rails; and
each of said drive wheels of said left-hand and right-hand power rail drive assemblies being operatively coupled to said rail drive gearbox within said respective left-hand and right-hand power rail drive assemblies.

4. The transmission system of claim 3, wherein:
each of said rail drive gearboxes is a worm gearbox comprising a worm gear meshingly engaged with a worm wheel.

5. The transmission system of claim 4, wherein:
said drive wheel of each of said left-hand and right-hand power rail drive assemblies being fixedly coupled to said respective worm wheel by a drive shaft.

6. The transmission system of claim 5, wherein:
an output shaft projecting from said driven bevel gear of each of said left-hand and right-hand bevel gearboxes is releasably coupled with said worm gear of said worm gearbox of said respective left-hand and right-hand power rail drive assemblies.

7. The transmission system of claim 6, wherein:
a quick connection interface releasably couples said output shaft of said driven bevel gear of each of said left-hand and right-hand bevel gearboxes with said worm gear of each of said respective left-hand and right-hand power rail drive assemblies.

8. The transmission system of claim 7, wherein:
each of said quick connection interfaces includes an engagement shaft having a meshing spline projecting from a lower end of said engagement shaft; and
each of said worm gears includes an upper worm end having a face spline configured to matingly engage with a respective one of said meshing splines.

9. The transmission system of claim 8, wherein:
said motor is a dual output brushless motor having a first speed and a second speed.

10. The transmission system of claim 9, wherein:
each of said worm gearboxes is retained within a respective mounting bracket fixedly coupled to said upper channel of a respective one of said left-hand and right-hand power rail drive assemblies.

11. The transmission system of claim 10, wherein:
each worm gearbox of each of said left-hand and right-hand long rail assemblies being repositionable within said respective mounting bracket; and
each worm gearbox being biased within said respective mounting bracket by a spring such that said drive wheel of each worm gearbox is biased towards an engaged position with said rack of said respective left-hand and right-hand long rail assembly.

12. The transmission system of claim 11, wherein:
each of said bevel gearboxes has a 2:1 gear ratio between said driving bevel gear and said driven bevel gear.

13. The transmission system of claim 12, wherein:
each of said worm gearboxes has a 20:1 gear ratio.

* * * * *